(12) United States Patent
Shim et al.

(10) Patent No.: US 8,216,338 B2
(45) Date of Patent: Jul. 10, 2012

(54) BEARING HAVING IMPROVED CONSUME RESISTIVITY AND MANUFACTURING METHOD THEREOF

(75) Inventors: Dong-Seob Shim, Gyeonggi-do (KR); Chung-Rea Lee, Incheon (KR)

(73) Assignee: Doosan Infracore Co., Ltd., Incheon (KR)

( * ) Notice: Subject to any disclaimer, the term of this patent is extended or adjusted under 35 U.S.C. 154(b) by 475 days.

(21) Appl. No.: 12/515,506

(22) PCT Filed: Nov. 20, 2007

(86) PCT No.: PCT/KR2007/005828
§ 371 (c)(1),
(2), (4) Date: May 19, 2009

(87) PCT Pub. No.: WO2008/062987
PCT Pub. Date: May 29, 2008

(65) Prior Publication Data
US 2009/0274403 A1    Nov. 5, 2009

(30) Foreign Application Priority Data

Nov. 20, 2006   (KR) .................. 10-2006-0114237

(51) Int. Cl.
*B22F 5/10* (2006.01)
*F16C 33/04* (2006.01)

(52) U.S. Cl. ............. 75/231; 384/279; 75/243; 75/244; 75/246

(58) Field of Classification Search .............. 75/231, 75/243, 244, 246; 419/27, 38
See application file for complete search history.

(56) References Cited

U.S. PATENT DOCUMENTS

| | | | |
|---|---|---|---|
| 4,437,890 A * | 3/1984 | Hayasaka et al. ............ | 75/244 |
| 5,632,861 A | 5/1997 | Crouse | |
| 6,086,257 A * | 7/2000 | Lee ............................ | 384/279 |
| 2004/0123698 A1* | 7/2004 | Takayama et al. ........... | 75/246 |
| 2008/0146467 A1* | 6/2008 | Takayama .................... | 508/105 |

FOREIGN PATENT DOCUMENTS

| | | |
|---|---|---|
| JP | 08-295896 | 11/1996 |
| KR | 10-0261369 | 4/2000 |
| KR | 1020060027038 | 3/2006 |

OTHER PUBLICATIONS

Search Report dated Feb. 19, 2008 for International application No. PCT/KR2007-005828, filed Nov. 20, 2007.
Written Opinion dated Feb. 19, 2008 for International application No. PCT/KR2007-005828, filed Nov. 20, 2007.

* cited by examiner

*Primary Examiner* — Roy King
*Assistant Examiner* — Ngoclan T Mai
(74) *Attorney, Agent, or Firm* — John D. Veldhuis-Kroeze; Westman, Champlin & Kelly, P.A.

(57) ABSTRACT

Disclosed is a composition for a bush-type bearing, a bush-type bearing manufactured using the composition, and a method of manufacturing the bush-type bearing. The bearing has excellent friction characteristics with a shaft made of iron (Fe) based material, and thus is able to increase the lubrication cycle of a lubricant. Further, the bearing has excellent hardness, and thus is able to prevent plastic deformation under high contact pressure.

4 Claims, 2 Drawing Sheets

BEARING HAVING IMPROVED CONSUME RESISTIVITY AND MANUFACTURING METHOD THEREOF

CROSS-REFERENCE TO RELATED APPLICATION

This Application is a Section 371 National Stage Application of International Application No. PCT/KR2007/005828, filed Nov. 20, 2007 and published as WO2008/062987 on May 29, 2008, in English.

FIELD OF THE DISCLOSURE

The present invention relates to a bush-type bearing, which is fitted around a shaft, and permits the fitted shaft to rotate smoothly. More particularly, the present invention relates to a wear-resistant bush-type bearing, which has high wear-resistance and increases a lubrication cycle, and a method of manufacturing the same.

BACKGROUND OF THE DISCLOSURE

In general, industrial machinery and construction machinery have a plurality of shaft rotating parts. Such a shaft rotating part is typically provided with a bush-type bearing, which is disposed between the shaft and a hole for the shaft (shaft hole) so as to reduce frictional resistance between the shaft and the shaft hole.

Conventionally, as an example of such a bush-type bearing, a brass-based or iron-based bearing was mainly used. In recent days, the bush-type bearing has been sintered, and then been impregnated with a lubricant. Thereby, the bush-type bearing has been used as an oilless bearing, which can reduce frictional resistance between the shaft and the shaft hole without frequently feeding the lubricant.

In detail, bearing is mainly formed of an iron (Fe)-based or copper (Cu)-based alloy. In the case in which a lubricant film is broken on sliding conditions of high contact pressure and high temperature, so this bearing gives rise to burn-on due to the friction with the shaft, the counterpart, formed of a Fe-based alloy.

In order to solve this problem, an attempt is made to impregnate the bearing with various lubricants. As one example, in Korean Patent No. 0261369, a proposal is made to impregnate a bearing with a lubricant having viscosity ranging from 260 cSt to 950 cSt.

However, in the case in which this bearing is used on conditions of high contact pressure and low speed, for instance, high contact pressure from about 3 kgf/mm$^2$ to about 8 kgf/mm$^2$ and low speed from about 1 cm/sec to about 5 cm/sec, the viscosity of the lubricant becomes lowered when the bearing and its surroundings are exposed to high temperature due to frictional heat. As a result, an intermetallic contact occurs between the shaft formed of Fe-based material and the bearing formed of the same Fe-based material as the shaft, so that frictional characteristics of the bearing are deteriorated.

In order to avoid this problem, the lubricant must be frequently fed to the bearing. However, this causes another problem in that a lubrication cycle is shortened.

In this manner, the lubricant, with which the bearing is impregnated, is easily deteriorated on the conditions of high temperature and high contact pressure, thereby failing to exert its original function. In this state, it is natural that the intermetallic contact occurs.

However, as for an intermetallic wear behavior caused by the intermetallic contact, intermetallic burn-on resulting from high temperature caused by friction occurs together with plastic deformation of metal resulting from the high contact pressures Thus, the bearing as well as the counterpart, the shaft, is subjected to abnormal wear, so that an entire system of the shaft and the bearing is damaged.

SUMMARY

An embodiment of the present invention relates to a composition for a bearing, which comprises: on the basis of the total weight thereof, 0.7 wt % to 10 wt % of nickel (Ni); 0.01 wt % to 0.5 wt % of silicon (Si); 0.005 wt % to 0.4 wt % of boron (B); 0.01 wt % to 1.0 wt % of carbon (C); 15 wt % to 25 wt % of copper (Cu); and the balance being Fe. According to an embodiment of the present invention, the composition may further comprise 0.03 wt % to 1.5 wt % of chrome (Cr) on the basis of the total weight thereof.

According to an embodiment of the present invention, the bearing includes a bush-type bearing having a body with an inner diameter part, into which a shaft is rotatably fitted.

Here, the shaft applied to the bearing is not particularly limited to its type. For example, the shaft can include a shaft made of iron or steel.

Further, embodiments of the present invention provide a bush-type bearing, which has a body with an inner diameter part into which a shaft is rotatably fitted, and is formed by a composition comprising: on the basis of the total weight thereof, 0.7 wt % to 10 wt % of nickel (Ni); 0.01 wt % to 0.5 wt % of silicon (Si); 0.005 wt % to 0.4 wt % of boron (B); 0.01 wt % to 1.0 wt % of carbon (C); 15 wt % to 25 wt % of copper (Cu); and the balance being Fe. According to an embodiment of the present invention, the bearing may be manufactured by the composition further comprising 0.03 wt % to 1.5 wt % of chrome (Cr) on the basis of the total weight thereof.

The bearing is preferably a sintered compact formed by sintering the composition. According to an embodiment of the present invention, the bearing may include pores within a range from 15 vol % to 25 vol % on the basis of an entire volume thereof. In the case in which the bearing is formed by sintering, the bearing is advantageous to form the pores therein.

In embodiments of the bearing of the present invention, a lubricant is impregnated into the pores, and thus can reduce unnecessary friction with the shaft when the bearing is used. According to an embodiment of the present invention, the bearing may contain the lubricant ranging from 15 vol % to 25 vol % on the basis of an entire volume thereof.

There are no particular limitations on a type of the lubricant applied to the bearing according to embodiments of the present invention. Thus, it can be understood to those skilled in the art that a proper lubricant can be selected and used as necessary. It is natural that a commercially available lubricant can be used.

According to an embodiment of the present invention, a lubricant, which has kinematic viscosity within a range from 80 cSt to 1000 cSt and viscosity index within a range from 150 to 280 at 40° C. can be used. More preferably, a lubricant having kinematic viscosity within a range from 80 cSt to 240 cSt and viscosity index within a range from 150 to 280 at 40° C. can be impregnated into the pores of the bearing.

Meanwhile, a variety of additives can be added to the lubricant as necessary, so that the physical properties can be improved so as to be suitable for specific conditions applied to the bearing.

According to an embodiment of the present invention, the lubricant may further comprise at least one wear-resistant extreme-pressure additive selected from the group consisting of zinc dithiophosphate, amine phosphate, dithiocarbamate, sulfur compound, phosphorus compound, and boron compound. The wear-resistant extreme pressure additive may be added within a range from 0.1 wt % to 1.0 wt % on the basis of an entire weight of the bearing.

According to an embodiment of the present invention, the lubricant may further comprise at least one solid lubricant selected from the group consisting of graphite, molybdenum disulfide ($MoS_2$), polytetrafluoroethylene (PTFE), and Teflon. The solid lubricant may be added within a range from 0.1 wt % to 2.0 wt % on the basis of an entire weight of the bearing.

The bearing according to an embodiment of the present invention can be advantageously applied to the shaft made of iron or steel, because the bearing according to an embodiment of the present invention has excellent slidability with respect to the member made of iron or steel.

Further, an embodiment of the present invention provides a method of manufacturing a bush-type bearing, which comprises: a powder preparing step (S10) of preparing powders of a composition for the bearing consisting of 0.7 wt % to 10 wt % of nickel (Ni), 0.01 wt % to 0.5 wt % of silicon (Si), 0.005 wt % to 0.4 wt % of boron (B), 0.03 wt % to 1.5 wt % of chrome (Cr), 0.01 wt % to 1.0 wt % of carbon (C), 15 wt % to 25 wt % of copper (Cu), and the balance of Fe; a powder mixing step (S20) of mixing the prepared powders; a pre-form forming step (S30) of pressing the mixed powders to form a bush-type bearing pre-form having an inner diameter part into which a shaft is rotatably fitted; and a sintering step (S40) of sintering the pre-form at a temperature from 1000° C. to 1150° C. to form a sintered compact.

The bearing manufactured by the manufacturing method of an embodiment of the present invention using the disclosed composition can maintain optimal friction characteristics under high contact pressure. Thus, a bearing having excellent wear resistance and long lubrication cycle can be provided. Further, the use of the bearing of embodiments of the present invention allows the shaft that is in contact with the bearing to exert excellent wear resistance, and reduces the incompatibility to the counterpart, i.e. the shaft.

DETAILED DESCRIPTION OF ILLUSTRATIVE EMBODIMENTS

Hereinafter, a wear-resistant bearing according to an embodiment of the present invention will be described in detail with reference to the accompanying drawings.

Figure 1:
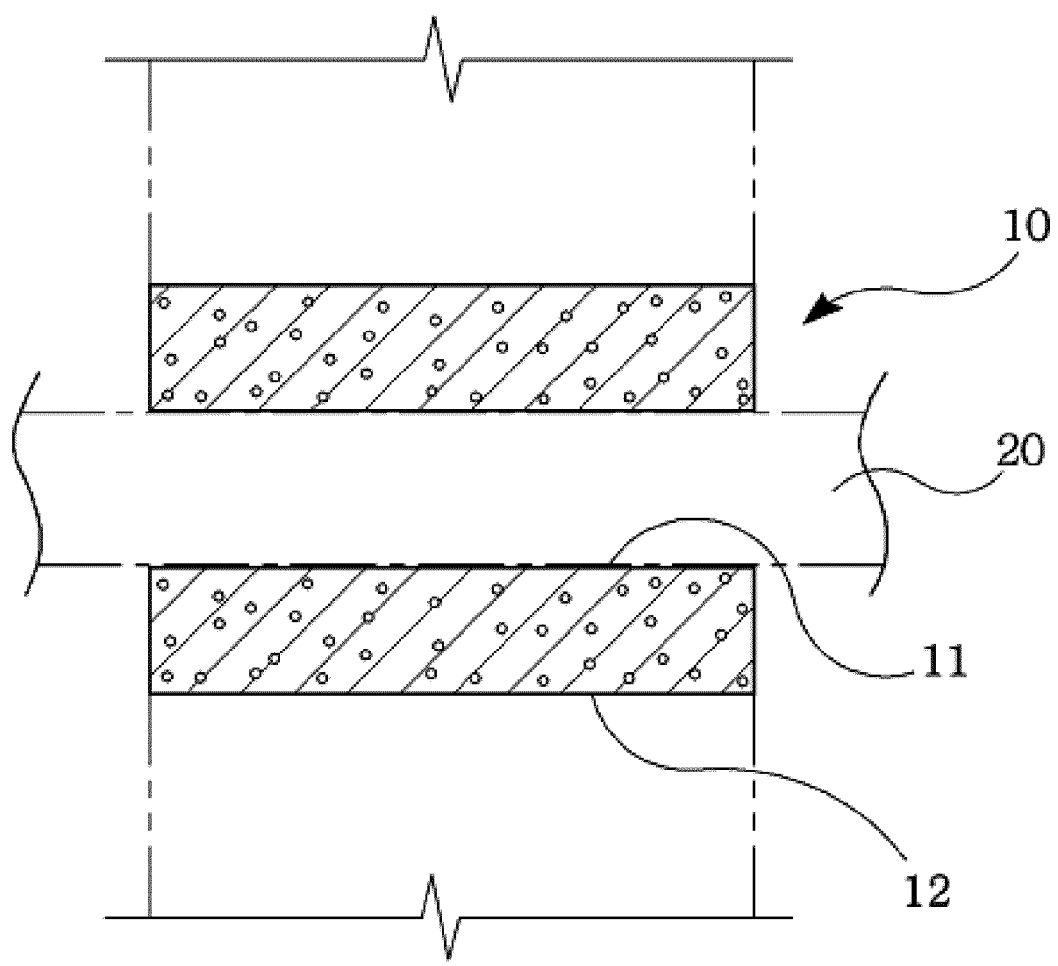
FIG. 1 is a sectional view illustrating a wear resistant bearing according to an embodiment of the present invention.

Referring to FIG. 1, a wear resistant bearing 10 according to an embodiment of the present invention comprises a body 12 having an inner diameter part 11 as a hole for a shaft 20. The shaft 20 is rotatably fitted into the inner diameter part 11 of the body 12.

The bearing body 12 is formed of a composition for the bearing according to embodiments of the invention. This composition comprises iron (Fe) as a main material, copper (Cu), nickel (Ni), and carbon (C). The composition additionally comprises boron (B) and silicon (Si). According to one example of the present invention, the composition further comprises chrome (Cr). Each component of the composition can be prepared in the form of powder. Thus, the bearing according to embodiments of the invention can be manufactured by forming the composition into the bearing body, and then sintering the bearing body. In other words, the bearing according to embodiments of the invention is preferably formed as a sintered compact by sintering. After the sintering, the bearing is press-fitted into the shaft hole.

More specifically, the composition for the bearing according to embodiments of the invention comprises, on the basis of the total weight thereof, 0.7 wt % to 10 wt % of Ni, 0.01 wt % to 0.5 wt % of Si, 0.005 wt % to 0.4 wt % of B, 0.01 wt % to 1.0 wt % of C, 15 wt % to 25 wt % of Cu, and the balance being Fe. The composition according to an example of the present invention further comprises 0.03 wt % to 1.5 wt % of Cr.

The bearing 10 can be obtained by preparing each component of the composition for the bearing at a weight ratio, and then forming and sintering the composition. The bearing of embodiments of the present invention can maintain optimal frictional characteristics under high temperature and high contact pressure, so that it can have excellent wear-resistance as well as excellent hardness compared to a conventional bearing.

Among the components, Ni has excellent low friction characteristics with respect to the Fe-based material, and thus can improve the low friction characteristics of the bearing, which causes friction with the shaft formed of Fe-based alloy or steel. However, when the content of Ni is less than 0.7 wt %, the amount of Ni is not sufficient, and thus the low friction characteristics are not satisfactory. Meanwhile, Ni has excellent wettability with Fe, and when the content of Ni is more than 10 wt %, it is difficult to form pores in the bearing due to the wettability of Ni with the Fe-based material.

Silicon (Si) has an effect of lowering a melting point of the composition of the bearing which is in the form of alloy powder. For example, in the case of the composition of embodiments of the present invention in which Ni having the melting point of 1400° C. or more is used, the sintering temperature is no alternative to be increased. As such, the sintering has a possibility of consuming a large quantity of energy. However, when Si is used within a range from 0.01 wt % to 0.5 wt %, the sintering temperature of the entire composition can be reduced to 1150° C. or less. The sintering temperature of 1150° C. is a temperature at which the sintering is possible in a commercial vacuum furnace. In the case of the bearing composition of embodiments of the present invention, because Si is used, the sintering can be carried out in the typical commercial vacuum furnace.

Boron (B) is a component that forms boride, as strengthening material, strengthening, particularly, hardness of the sintered compact. When the content of B is less than 0.005 wt %, the boride is not properly formed. When the content of B is more than 0.4 wt %, the material itself is subjected to embrittlement, and thereby the contact pressure characteristics of the final sintered compact are deteriorated. The component of B can be contained in the composition in the state of a pure element. However, according to an example of the present invention, the component of B can be added to the composition in the state of a compound such as boron carbide ($B_4C$) or boron nitride (BN), which provides B by decomposition in the sintering process.

Carbon (c) is an element that is added to the composition for the purpose of dissolving it into Fe to form solid-solution and thus hardening Fe by means of, for instance, heat treatment. When the content of C is less than 0.1 wt %, an effect of solid-solution hardening caused by heat treatment, etc. is insignificant. When the content of C is more than 1.0 wt %, materials such as carbide, etc. are formed in the sintering process, and thus causing the embrittlement of the material.

Cu is added to a sintered Fe-based alloy, thereby not only acting as a binder of Fe powder but also serving to maintain the low friction characteristics. When the content of Cu is less than 15 wt %, the low friction characteristics are deteriorated. When the content of Cu is more than 25 wt %, the hardness of the sintered compact is lowered.

Cr is also a component that forms fine carbide. When the content of Cr is less than 0.03 wt %, the formation of carbide is slight. When the content of Cr is more than 1.5 wt %, this causes embrittlement of the material.

According to an example of the present invention, the bearing of an embodiment of the present invention is a sintered compact formed by sintering the composition for the bearing having such a component ratio.

Figure 2:
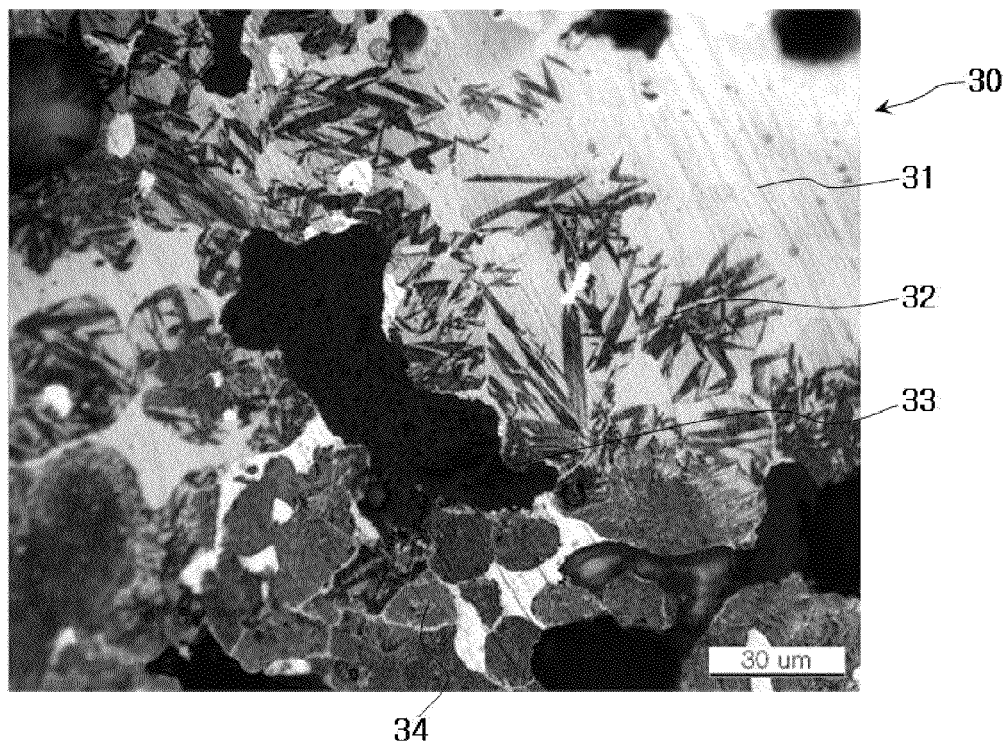
FIG. 2 is a photograph illustrating the structure of a sintered compact formed into a wear resistant bearing according to an embodiment of the present invention.

An internal structure of the bearing sintered compact formed by the sintering is photographed using an electron microscope, which is shown in FIG. 2. As shown in FIG. 2, the sintered compact 30 includes a Ni—Fe alloy 31 formed of a Ni-based material having excellent friction characteristics with the Fe-based alloy that is a major material of the shaft as the counterpart, boride 32 forming high hardness, and a plurality of pores 33, and a Fe—Cu alloy 34. Here, the boride 32 is formed in an acicular structure, is mainly grouped around the pores 33, and is formed in the Ni—Fe alloy 31.

The plurality of pores 33 formed in the sintered compact 30 act as spaces for impregnating a lubricants These pores are formed in the process of sintering a powder pre-form. The lubricant is impregnated into the pores 33, so that the bearing can have a lubricating characteristic. A wear-resistant extreme pressure additive can be added to this lubricant. Further, this lubricant may further include a solid lubricant. The wear-resistant extreme-pressure additive and the solid lubricant can improve the lubricating characteristic of the bearing.

According to an example of the present invention, the bearing can have the pores within a range from 15 vol % to 25 vol % on the basis of an entire volume thereof. As a result, the bearing can contain the lubricant ranging from 15 vol % to 25 vol % on the basis of an entire volume thereof.

When the pores are less than 15 vol % to the volume of bearing sintered compact, it is difficult to impregnate the lubricant for sufficient lubrication. When the pores are more than 25 vol %, the strength of the bearing is lowered, so that the bearing is subjected to plastic deformation when frictional wear occurs, and thus can be damaged.

According to an example of the present invention, the lubricant can be used under conditions: kinematic viscosity having a range from 80 cSt to 1,000 cSt, preferably a range from 80 cSt to 240 cSt, at 40° C.; and viscosity index ranging from 150 to 280. When the kinematic viscosity is less than 80 cSt, the lubricant is too sticky, and thus does not well flow out toward a frictional surface when used. When the kinematic viscosity is more than 1,000 cSt, the lubricant is too watery, and thus does not well remain in the pores. Preferably, the viscosity is 240 cSt or less.

Meanwhile, in the bearing of an embodiment of the present invention, the viscosity index of the lubricant impregnated into the bearing can be increased. Thereby, although the bearing 10 impregnated with the lubricant experiences sharp increase in temperature while being used under extremely severe conditions, for example, of high contact pressure of about 3 $kgf/mm^2$ to about 8 $kgf/mm^2$, and of low speed of about 1 cm/sec to about 5 cm/sec, the lubricant can always maintain constant viscosity.

Above all, if the lubricant does always maintain constant viscosity under the condition of high temperature, the friction characteristics and the wear resistant characteristics of the bearing 10 will not be deteriorated in spite of sharp increase in the temperature of the bearing 10. Further, since the lubricant does always maintain constant viscosity under the condition of high temperature, the lubricant can be not only prevented from oozing from the pores 33 of the bearing 10 in spite of sharp increase in the temperature of the bearing 10, but also impregnated into the pores 33 again even if it oozes temporarily. In this manner, if the lubricant does not ooze from the pores 33 of the bearing 10, a retaining cycle of the lubricant is prolonged, and thus a lubricating cycle of the lubricant can be increased.

Meanwhile, the wear-resistant extreme pressure additive, which can be used together with the lubricant, can function to react with a metal surface to form a thin film. For example, as the wear-resistant extreme pressure additive, at least one selected from the group consisting of zinc dithiophosphate, amine phosphate, dithiocarbamate, sulfur compound, phosphorus compound, and boron compound can be used. According to an example of the present invention, the wear-resistant extreme pressure additive can be added within a range from 0.1 wt % to 1.0 wt % on the basis of an entire weight of the bearing 10.

This wear-resistant extreme-pressure additive reacts with the metal surface to form the thin film, and thus prevents the shaft 20 from being in direct contact with the bearing 10. In particular, the prevention of the direct contact between the shaft 20 and the bearing 10 remarkably reduces the frictional resistance between the shaft 20 and the bearing 10. The remarkable reduction of the frictional resistance between the shaft 20 and the bearing 10 improves wear-resistant performance of the bearing 10.

Furthermore, the solid lubricant includes solid powder or flaky solid type lubricant, which can perform lubrication by means of internal slip of a particle crystal itself, slip between particles, slip with a frictional surface of the particle, and so on. Examples of this solid lubricant include graphite, sulfide based material such as molybdenum disulfide ($MoS_2$), and resin based material such as polytetrafluoroethylene (PTFE), Teflon, etc. This solid lubricant can be added within a range from 0.1 wt % to 2.0 wt % on the basis of an entire weight of the bearing 10.

Figure 3:
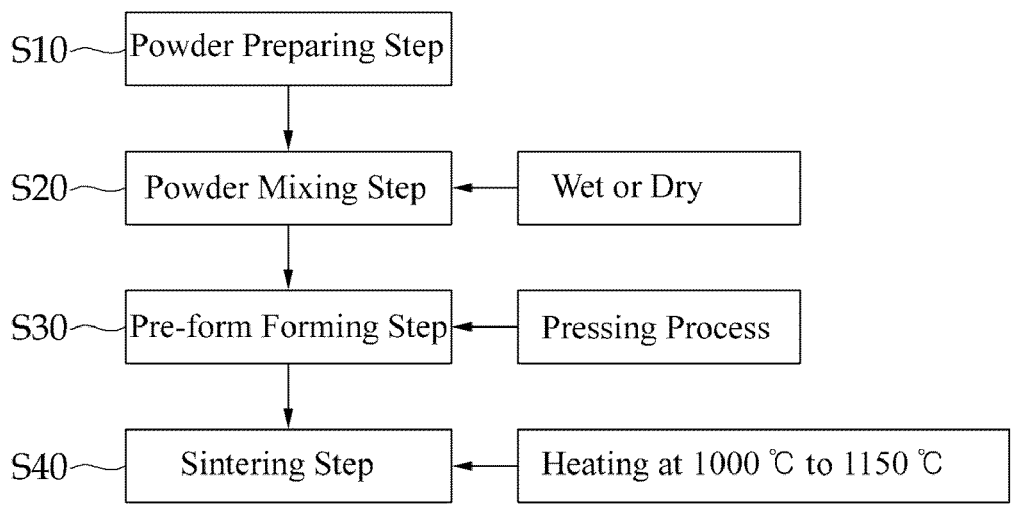
FIG. 3 is a flowchart illustrating a method of manufacturing a wear resistant bearing according to an embodiment of the present invention.

The method of manufacturing the bearing according to embodiments of the present invention will be described with reference to FIG. 3. First, as the composition for the bearing, Ni, Si, B, Cr, C, Cu and Fe components are prepared (S10). These components can make use of powder type products that are available from the market. The powders can be either pure metal ones in which the respective components are made independently, or alloy ones in which the components are alloyed in whole or in part.

The powders prepared in this way are mixed using a wet or dry mixing method (S20), and then a pre-form is formed by a pressing process (S30). There is no special limitation on a shape of the pre-form, and so the shape of the pre-form has only to be formed so as to be suitable for the shape of the counterpart that performs sliding. For example, in the case in which a bush-type bearing is manufactured, the pre-form can be manufactured in the shape of an annular bush. At this time, the pressed pressure can set to a range from 10 kg/cm² to 300 kg/cm².

Subsequently, the pre-form is sintered under vacuum or in air at a temperature from 1000° C. to 1150° C., and thereby a sintered compact is manufactured (S40).

The bearing manufactured in the form of the sintered compact by embodiments of the present invention is safe from the plastic deformation and maintains the low friction characteristic, so that it can increase the lubrication cycle.

Meanwhile, the case in which the pure metal powders made of the respective components of the composition for the bearing are mixed, and the case in which the alloy powders made of whole or some of the components are mixed, both exert the same effects.

Further, even when the inter diameter part of the bearing which is formed of a sintered compact and the outer diameter part of the bearing which is formed of a Fe-based matrix are bonded with each other, the same effects as the formers are obtained because the part contacting the pin or the shaft is made of the same sintered compact.

Hereinafter, embodiments of the present invention will be described in greater detail through embodiments and comparative examples.

Embodiment 1 and Comparative Examples 1 Through 6

Powders having a composition listed in the following Table 1 were prepared, and mixed by a wet mixing method using Kenolube™ based on stearic acid, and then pressed with a pressure of 100 kg/cm². Thereby, annular bush-type pre-forms were formed. Subsequently, the pre-forms were sintered under vacuum at a temperature from 1100° C. to 1400° C. (see Table 3). Thereby, sintered compacts were manufactured.

At this time, before being sintered at a temperature from 1100° C. to 1400° C., samples of Embodiment 1 and Comparative Examples 1 to 6 are categorized into two groups, one of which was subjected to heat treatment at 600° C., and the other of which was not subjected to heat treatment.

TABLE 1

| Component | Fe (wt %) | Cu (wt %) | C (wt %) | Ni (wt %) | Cr (wt %) | Si (wt %) | B₄C (wt %) |
|---|---|---|---|---|---|---|---|
| Embod. 1 | 72 | 20 | 1 | 5.5 | 1 | 0.3 | 0.2 |
| Compar. 1 | 79 | 20 | 1 | — | — | — | — |
| Compar. 2 | 78 | 20 | 1 | 1 | — | — | — |
| Compar. 3 | 74 | 20 | 1 | 5 | — | — | — |
| Compar. 4 | 69 | 20 | 1 | 10 | — | — | — |
| Compar. 5 | 68.9 | 20 | 1 | — | 0.1 | — | — |
| Compar. 6 | 68 | 20 | 1 | — | 1 | — | — |

Test Example 1

Friction Characteristic Test

Friction characteristics were tested on the bush-type bearings manufactured in Embodiment 1 and Comparative Examples 1 to 6. In the friction characteristic test, friction coefficients of the bearings, in which shafts were mounted, were measured using a dedicated test machine, and a time which it took the friction coefficient to reach 0.3 or more was set to a lubrication cycle. The friction characteristic test was performed on one of the two groups of the Embodiment 1 and Comparative Examples 1 to 6, i.e. the group that was subjected to heat treatment at 600° C.

As for detailed test conditions, first, the high contact pressure was set to 10 kg/mm², which was higher than common value of 2 kg/mm² to 5 kg/mm² applied to an general bush. The temperature was set to 150° C. or more, which was the temperature when the viscosity of the lubricant becomes deteriorated.

In this test, mineral oil having kinematic viscosity of 221 cSt was used as the lubricant, zinc dithiophosphate was used as the wear-resistant extreme-pressure additive, and molybdenum disulfide ($MoS_2$) was used as the solid lubricant.

The test results are summarized in Table 2. Here, a fraction of the lubricant is a fraction (vol %) based on the volume of the bearing made of a sintered compact, and the other fractions are fractions (wt %) based on the weight.

TABLE 2

| Type | Lubricant Impregnation (vol %) | Wear-resistant Extreme Pressure Additive (wt %) | Solid Lubricant (wt %) | Time Which It Takes Friction Coefficient to Reach 0.3 or More (Lubrication Cycle, Hour) |
|---|---|---|---|---|
| Embod. 1 | None | None | None | 509 |
|  | Yes (25%) | None | None | 521 |
|  | Yes (15%) | 1% | None | 537 |
|  | Yes (15%) | 0.1% | 1% | 551 |
| Compar. 1 | None | None | None | 208 |
|  | Yes (25%) | None | None | 253 |
|  | Yes (15%) | 1% | None | 274 |
|  | Yes (15%) | 0.1% | 2% | 308 |
| Compar. 2 | None | None | None | 150 |
| Compar. 3 | None | None | None | 152 |
| Compar. 4 | None | None | None | 155 |
| Compar. 5 | None | None | None | 200 |
| Compar. 6 | None | None | None | 202 |

According to the test results, the bearing of Embodiment 1 of the present invention showed much longer lubrication cycle compared to those of Comparative Examples 1 to 6 of the conventional art. This proves that the bearing of embodiments of the present invention has a wear resistance characteristic more excellent than the conventional bearing. Comparing the test results of Embodiment 1 and Comparative Example 1, it could be found that the lubrication cycle of the bearing of Comparative Example 1, to which the lubricant, the wear-resistant extreme-pressure additive and the solid lubricant were added, was shorter than that of the bearing of Embodiment 1, to which the lubricant, the wear-resistant extreme pressure additive and the solid lubricant were not added. Further, in the case of the bearing manufactured in Embodiment 1 of the present invention, it could be found that the lubrication cycle was very prolonged when the lubricant, the wear-resistant extreme pressure additive, and the solid lubricant were added.

Meanwhile, it is apparent that other component not exemplified in the above Embodiment and Comparative Examples have the effects. For example, synthetic oil has an effect as the lubricant, amine phosphate, dithiocarbamate, and sulfur compound have an effect as wear-resistant extreme-pressure additive, and graphite has an effect as the solid lubricant.

Test Example 2

Hardness Measurement

Hardness was tested on the bush-type bearings manufactured in Embodiment 1 and Comparative Examples 1 to 6. In the hardness measurement, a typical hardness tester was used. At this time, the hardness was measured with respect to the two groups of the Embodiment 1 and Comparative Examples 1 to 6, i.e. the group, which was subjected to heat treatment at 600° C. before sintered, and the other group, which was not subjected to heat treatment. The measurement results were summarized in the following Table 3.

TABLE 3

| Type | Hardness without heat treatment before sintered (Hv) | Hardness with heat treatment before sintered (Hv) | Sintering Temperature (° C.) |
|---|---|---|---|
| Embod. 1 | 400 | 550 | 1100 |
| Compar. 1 | 250 | 550 | 1100 |
| Compar. 2 | 200 | 450 | 1400 |
| Compar. 3 | 210 | 440 | 1400 |
| Compar. 4 | 210 | 350 | 1450 |
| Compar. 5 | 250 | 540 | 1200 |
| Compar. 6 | 255 | 500 | 1200 |

According to the test results, it could be found that the bearing of an embodiment of the present invention had excellent hardness and excellent load supporting force, and prevented the plastic deformation under high contact pressure.

Thus, the use of the bearing manufactured by the composition of an embodiment of the present invention can improve the friction characteristics with the shaft made of the Fe-based material, and prevent the plastic deformation under high contact pressure by forming high-strength boride in the Fe-based material.

Accordingly, embodiments of the present invention have been made in an effort to solve the problems occurring in the conventional art. Thus an embodiment of the present invention has a wear resistant material, which has low-friction, high-contact-pressure characteristics and does not cause plastic deformation under high contact pressure while representing low friction characteristics when friction of a bearing and a shaft occurs, and to manufacture a bush-type bearing using the wear resistant material, thereby being able not only to improve wear resistance of the bearing but also increase a lubrication cycle of the bearing.

Although the present disclosure has been described with reference to one or more examples, workers skilled in the art will recognize that changes may be made in form and detail without departing from the scope of the disclosure and/or the appended claims.

The invention claimed is:

1. A bush-type bearing having a body with an inner diameter part, into which a shaft is rotatably fitted, the bearing is formed by sintering a composition comprising, on the basis of the total weight thereof, 0.7 wt % to 10 wt % of nickel (Ni), 0.01 wt % to 0.5 wt % of silicon (Si), 0.005 wt % to 0.4 wt % of boron (B), 0.01 wt % to 1.0 wt % of carbon (C), 15 wt % to 25 wt % of copper (Cu) and a balance of Fe, wherein the bearing includes pores within a range from 15 vol % to 25 vol % on the basis of an entire volume thereof, and wherein the pores are impregnated with a lubricant, which has kinematic viscosity within a range from 80 cSt to 240 cSt and viscosity index within a range from 150 to 280 at 40° C.

2. The bearing according to claim 1, wherein:
the lubricant comprises at least one wear-resistant extreme-pressure additive selected from the group consisting of zinc dithiophosphate, amine phosphate, dithiocarbamate, sulfur compound, phosphorus compound, and boron compound; and
the wear-resistant extreme pressure additive is added within a range from 0.1 wt % to 1.0 wt % on the basis of an entire weight of the bearing.

3. The bearing according to claim 1, wherein:
the lubricant comprises at least one solid lubricant selected from the group consisting of graphite, molybdenum disulfide ($MoS_2$), polytetrafluoroethylene (PTFE), and Teflon; and
the solid lubricant is added within a range from 0.1 wt % to 2.0 wt % on the basis of an entire weight of the bearing.

4. A bush-type bearing having a body with an inner diameter part, into which a shaft is rotatably fitted, the bearing is formed by sintering a composition comprising, on the basis of the total weight thereof, 0.7 wt % to 10 wt % of nickel (Ni), 0.01 wt % to 0.5 wt % of silicon (Si), 0.005 wt % to 0.4 wt % of boron (B), 0.01 wt % to 1.0 wt % of carbon (C), 15 wt % to 25 wt % of copper (Cu) and a balance of Fe, wherein,
the bearing is a sintered compact formed by sintering the composition;
the sintered compact includes a plurality of pores, Ni—Fe alloy, Fe—Cu alloy, and boride; and
the boride is formed in an acicular shape, and is grouped around the pores.

* * * * *